US012236898B2

(12) United States Patent
Kim et al.

(10) Patent No.: US 12,236,898 B2
(45) Date of Patent: Feb. 25, 2025

(54) DISPLAY DEVICE AND DATA DRIVING CIRCUIT

(71) Applicant: LG Display Co., Ltd., Seoul (KR)

(72) Inventors: Beom-Jin Kim, Seoul (KR); Hyunwoo Kim, Seoul (KR); Bongchoon Kwak, Seoul (KR); HongJu Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/361,741

(22) Filed: Jul. 28, 2023

(65) Prior Publication Data

US 2024/0105125 A1 Mar. 28, 2024

(30) Foreign Application Priority Data

Sep. 26, 2022 (KR) ........................ 10-2022-0121825

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2310/0286* (2013.01); *G09G 2310/0291* (2013.01); *G09G 2310/0294* (2013.01); *G09G 2310/0297* (2013.01); *G09G 2310/08* (2013.01); *G09G 2320/0673* (2013.01)

(58) Field of Classification Search
CPC .. G09G 3/3275; G09G 3/3266; G09G 3/3283; G09G 3/3291
See application file for complete search history.

(56) References Cited

U.S. PATENT DOCUMENTS

| | | | | |
|---|---|---|---|---|
| 2006/0114191 A1* | 6/2006 | Choi | .................... | G09G 3/3275<br>345/76 |
| 2020/0202763 A1* | 6/2020 | Ahn | .................... | G09G 3/3275 |

* cited by examiner

*Primary Examiner* — Sardis F Azongha
(74) *Attorney, Agent, or Firm* — Seed IP Law Group LLP

(57) ABSTRACT

Embodiments of the disclosure relate to a display device and a data driving circuit. Specifically, there may be provided a display device comprising a display panel where a plurality of gate lines, a plurality of data lines, and a plurality of subpixels are disposed, a gate driving circuit configured to supply scan signals to the plurality of gate lines, a data driving circuit configured to convert digital image data into an analog data voltage and supply the analog data voltage to the plurality of data lines, a timing controller configured to control the gate driving circuit and the data driving circuit, a first gamma circuit generating a first gamma voltage corresponding to a first pixel during a period corresponding to a first color selection signal, and a second gamma circuit generating a second gamma voltage corresponding to a second pixel during a period corresponding to a second color selection signal different from the first color selection signal.

18 Claims, 11 Drawing Sheets

130

DISPLAY DEVICE AND DATA DRIVING CIRCUIT

CROSS-REFERENCE TO RELATED APPLICATION

This application claims priority from Korean Patent Application No. 10-2022-0121825, filed on Sep. 26, 2022, which is hereby incorporated by reference for all purposes as if fully set forth herein.

BACKGROUND

Technical Field

Embodiments of the disclosure relate to a display device and a data driving circuit.

Description of the Related Art

With the development of the information society, various needs for display devices that display images are increasing, and various types of display devices, such as liquid crystal displays, organic light emitting displays, etc., are being utilized.

Among these display devices, the organic light emitting display device uses self-emissive organic light emitting diodes, providing advantages, such as a fast response and better contrast ratio, luminous efficiency, luminance, and viewing angle.

The organic light emitting diode display include organic light emitting diodes in subpixels arranged on the display panel and emits the organic light emitting diodes by controlling the current flowing to the organic light emitting diodes, thereby controlling the brightness represented by each subpixel while displaying an image.

The subpixels are driven by scan signals applied through gate lines, and gray levels are represented according to the data voltages applied through data lines according to the timings when the scan signals are applied, displaying an image.

The display panel may come in various structures. As the display performance is enhanced, demand for large-scale, high-resolution display panels is gradually increasing.

The data driving circuit that supplies the data voltage to the display panel includes a gamma circuit that generates a gamma voltage corresponding to the color of the subpixel.

BRIEF SUMMARY

Inventors recognize that in a case that the data driving circuit includes a gamma circuit, it may take time for the gamma voltage to stabilize when the color changes while the gamma circuit generates the gamma voltage. Due to the stabilizing time of the gamma voltage, the display panel may experience degradation in image quality, such as horizontal line artifacts. The display device and a data driving circuit of the present disclosure can reduce horizontal line artifacts and enhance image quality.

Embodiments of the disclosure provide a display device and data driving circuitry that may sequentially provide gamma voltages using a plurality of gamma circuits, thereby securing a stabilization time for the gamma voltage and enhancing image quality.

Embodiments of the disclosure provide a display device and data driving circuitry that may enhance image quality while minimizing or reducing size increase by commonly using a latch circuit corresponding to a plurality of gamma circuits.

Embodiments of the disclosure provide a data driving circuit driving a display panel having pixels arranged in a matrix structure, each of the pixels including a plurality of subpixels and comprising a shift register configured to generate a sampling signal, a common sampling latch circuit configured to sequentially sample image data according to the sampling signal, a first holding latch circuit configured to output the image data sampled by the common sampling latch circuit in synchronization with a first source output enable signal, a second holding latch circuit configured to output the image data sampled by the common sampling latch circuit in synchronization with a second source output enable signal, a first gamma circuit configured to generate a first gamma voltage corresponding to a first pixel during a period corresponding to a first color selection signal, a second gamma circuit configured to generate a second gamma voltage corresponding to a second pixel during a period corresponding to a second color selection signal different from the first color selection signal, a first decoder configured to convert the image data transferred from the first holding latch circuit into an analog data voltage in response to the first gamma voltage, a second decoder configured to convert the image data transferred from the second holding latch circuit into an analog data voltage in response to the second gamma voltage, a multiplexer configured to output an analog data voltage corresponding to the first gamma voltage or the second gamma voltage according to the first gamma selection signal and the second gamma selection signal, and an output buffer configured to supply the analog data voltage to a corresponding data line.

Embodiments of the disclosure provide a data driving circuit configured to drive a display panel having pixels arranged in a matrix structure, each of the pixels including a plurality of subpixels and comprising a shift register configured to generate a sampling signal, a common sampling latch circuit configured to sequentially sample image data according to the sampling signal, a common holding latch circuit configured to output the image data sampled by the common sampling latch circuit in synchronization with a source output enable signal, a first gamma circuit configured to generate a first gamma voltage corresponding to a first pixel during a period corresponding to a first color selection signal, a second gamma circuit configured to generate a second gamma voltage corresponding to a second pixel during a period corresponding to a second color selection signal different from the first color selection signal, a first multiplexer configured to output image data corresponding to the first gamma voltage according to a first gamma selection signal, a second multiplexer configured to output image data corresponding to the second gamma voltage according to a second gamma selection signal, a first decoder configured to convert the image data transferred from the first multiplexer into an analog data voltage in response to the first gamma voltage, a second decoder configured to convert the image data transferred from the second multiplexer into an analog data voltage in response to the second gamma voltage, a third multiplexer configured to output an analog data voltage corresponding to the first gamma voltage or the second gamma voltage according to the first gamma selection signal and the second gamma selection signal, and an output buffer configured to supply the analog data voltage to a corresponding data line.

Embodiments of the disclosure provide a display device comprising a display panel where a plurality of gate lines, a plurality of data lines, and a plurality of subpixels are disposed, a gate driving circuit configured to supply scan signals to the plurality of gate lines, a data driving circuit configured to convert digital image data into an analog data voltage and supply the analog data voltage to the plurality of data lines, a timing controller configured to control the gate driving circuit and the data driving circuit, a first gamma circuit configured to generate a first gamma voltage corresponding to a first pixel during a period corresponding to a first color selection signal, and a second gamma circuit configured to generate a second gamma voltage corresponding to a second pixel during a period corresponding to a second color selection signal different from the first color selection signal. Embodiments of the disclosure may reduce horizontal line artifacts and enhance image quality.

In some implementations, embodiments of the disclosure sequentially provide gamma voltages using a plurality of gamma circuits, thereby securing a stabilization time for the gamma voltage and enhancing image quality.

In some implementations, embodiments of the disclosure may enhance image quality while minimizing or reducing size increase by commonly using a latch circuit corresponding to a plurality of gamma circuits.

DESCRIPTION OF THE SEVERAL VIEWS OF THE DRAWINGS

The above and other technical benefits, features, and technical improvements of the disclosure will be more clearly understood from the following detailed description, taken in conjunction with the accompanying drawings, in which.

DETAILED DESCRIPTION

Figure 1:
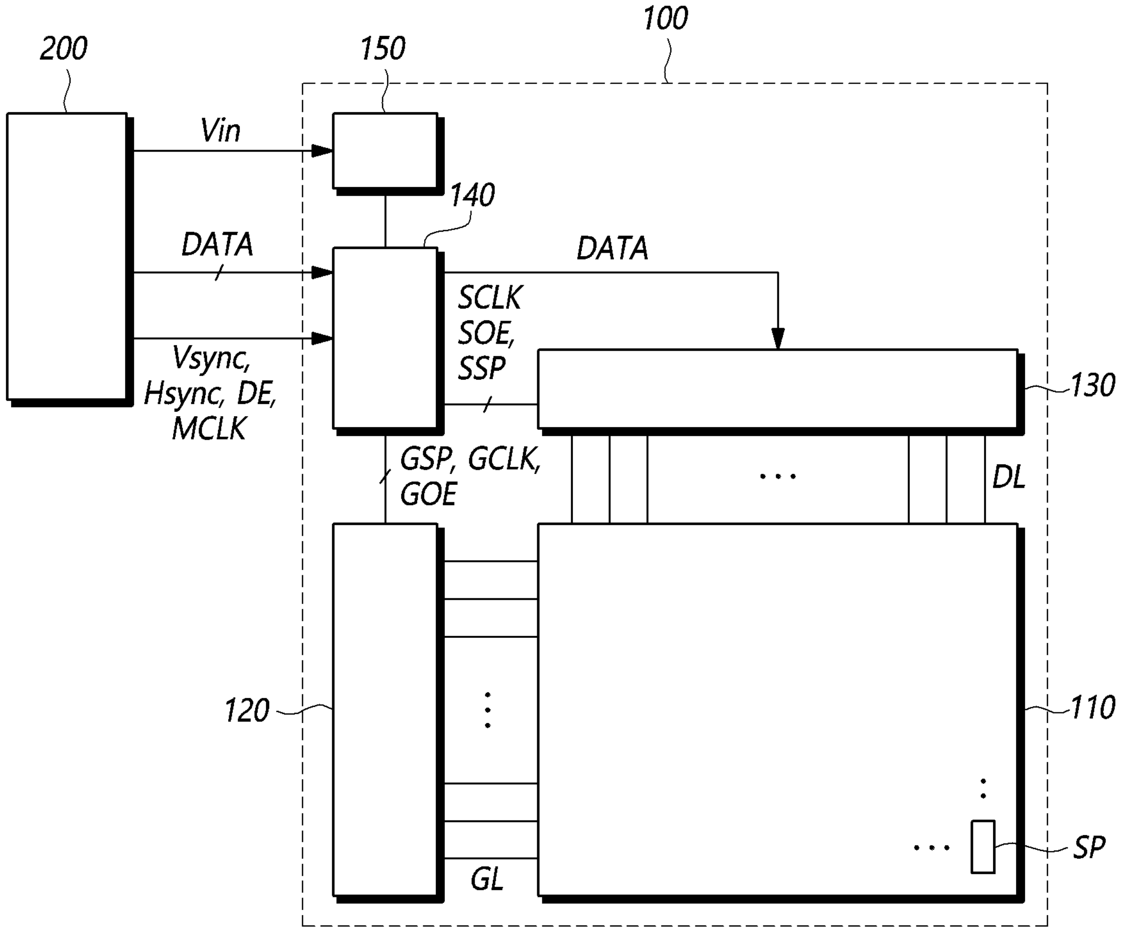
FIG. 1 is a view schematically illustrating a configuration of a display device according to various embodiments of the disclosure.

Hereinafter, some embodiments of the disclosure will be described in detail with reference to example drawings. In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "A," or "B" may be used herein to describe elements of the disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors, e.g., process factors, internal or external impact, noise, etc.) even when a relevant description is not specified. Further, the term "may" fully encompasses all the meanings of the term "can".

Hereinafter, various embodiments of the disclosure will be described in detail with reference to the accompanying drawings.

FIG. 1 is a view schematically illustrating a configuration of a display device according to various embodiments of the disclosure;

Referring to FIG. 1, a display device 100 according to embodiments of the disclosure may include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit 150.

The display panel 110 displays an image based on a scan signal transferred from the gate driving circuit 120 through the plurality of gate line GLs GL and the data voltage transferred from the data driving circuit 130 through the plurality of data lines DL.

In the case of a liquid crystal display, the display panel 110 may include a liquid crystal layer formed between two substrates and may be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 may be implemented in a top emission scheme, a bottom emission scheme, or a dual-emission scheme.

In the display panel 110, a plurality of pixels may be arranged in a matrix form, and each pixel may include subpixels SP having different colors, e.g., a white subpixel, a red subpixel, a green subpixel, and a blue subpixel, and each subpixel SP may be coupled to the plurality of data lines DL and the plurality of gate lines GL.

One subpixel SP may include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of red R), green G), and blue B), 3,840 data lines DL may be connected to 2,160 gate lines GL and three subpixels RGB, and thus, there may be provided 3,840×3=11,520 data lines DL. Each subpixel SP is disposed at the intersection between the gate line GL and the data line DL.

The gate driving circuit 120 may be controlled by the controller 140 to sequentially output scan signals to the plurality of gate lines GL disposed in the display panel 110, controlling the driving timing of the plurality of subpixels SP.

In the display device 100 having a resolution of 2,160×3,840, sequentially outputting the scan signal to the 2,160 gate lines GL from the first gate line to the 2,160th gate line may be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL may be referred to as N-phase driving.

The gate driving circuit 120 may include one or more gate driving integrated circuits (GDICs). Depending on driving schemes, the gate driving circuit 120 may be positioned on only one side, or each of two opposite sides, of the display panel 110. The gate driving circuit 120 may be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is applied through the gate line GL, each subpixel SP connected to the data line DL displays a light emitting signal having the brightness corresponding to the data voltage.

Likewise, the data driving circuit 130 may include one or more source driving integrated circuits SDIC, and the source driving integrated circuit SDIC may be connected to the bonding pad of the display panel 110 in a tape automated bonding (TAB) type or a chip-on-glass (COG) type or may be disposed directly on the display panel 110.

In some cases, each source driving integrated circuit SDIC may be integrated and disposed on the display panel 110. Further, each source driving integrated circuit SDIC may be implemented in a chip-on-film (COF) type and, in this case, each source driving integrated circuit SDIC may be mounted on a circuit film and may be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 may control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 may be any one of a television (TV) system, a set-top box, a navigation system, a personal computer (PC), a home theater system, a mobile device, and a wearable device.

The timing controller 140 may generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source clock SCLK, and a source output enable signal SOE, to control the data driving circuit 130. The source start pulse SSP controls the timing at which one or more source driving integrated circuits SDIC constituting the data driving circuit 130 start data sampling. The source clock SCLK is a clock signal that controls the timing of sampling data in the source driving integrated circuit SDIC. The source output enable signal SOE controls the output timing of the data driving circuit 130.

The display device 100 may further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, generating power to drive the display panel 110, the gate driving circuit 120, and the data driving circuit 130.

The subpixel SP is positioned at the intersection between the gate line GL and the data line DL, and a light emitting element may be disposed in each subpixel SP. For example, the organic light emitting diode display may include a light emitting element, such as an organic light emitting diode, in each subpixel SP and may display an image by controlling the current flowing to the light emitting element according to the data voltage.

The display device 100 may be one of various types of devices, such as liquid crystal displays, organic light emitting diode displays, or plasma display panels.

Figure 2:
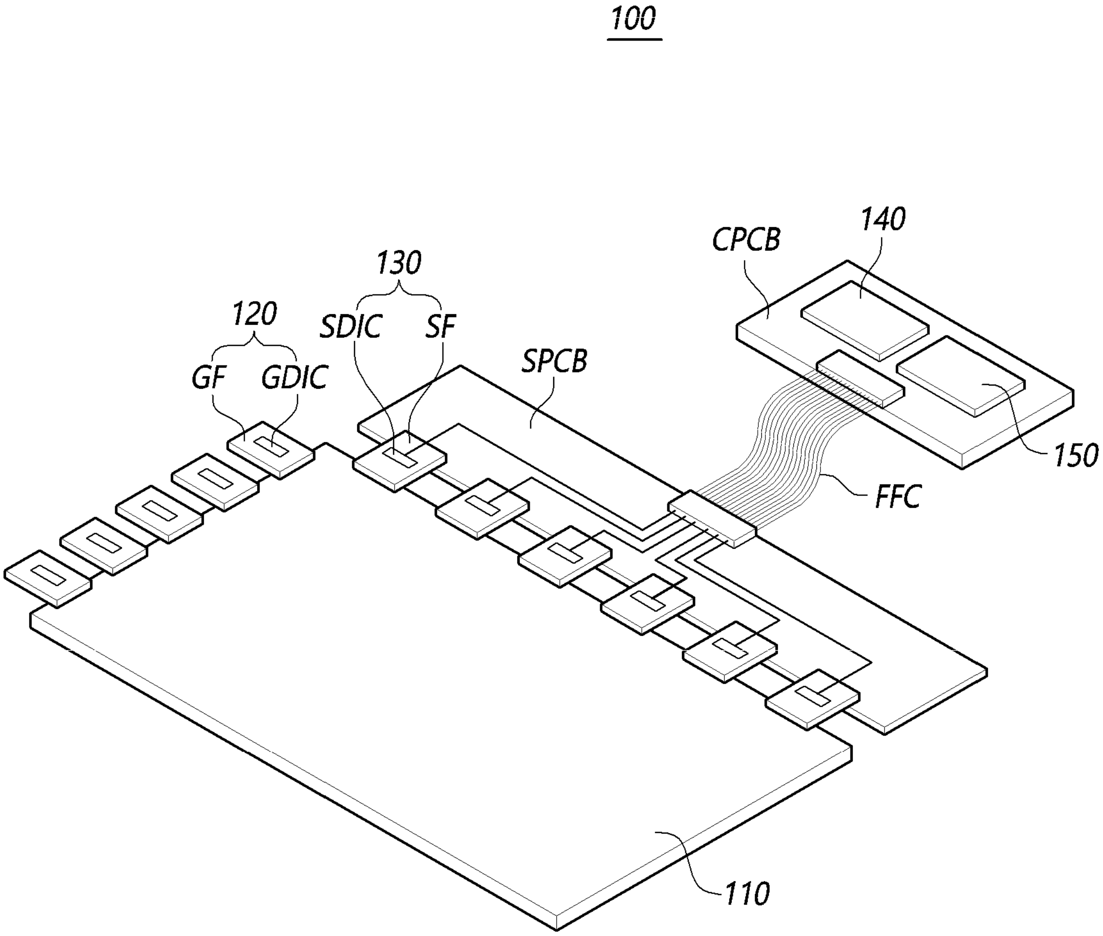
FIG. 2 is a view illustrating an example of a system of a display device according to embodiments of the disclosure.

FIG. 2 is a view illustrating an example of a system of a display device according to embodiments of the disclosure;

Referring to FIG. 2, in the display device 100 according to embodiments of the disclosure, the source driving integrated circuit SDIC included in the data driving circuit 130 and the gate driving integrated circuit GDIC included in the gate driving circuit 120 are implemented in the chip-on-film (COF) type among various types (e.g., TAB, COG, or COF).

One or more gate driving integrated circuits GDIC included in the gate driving circuit 120 each may be mounted on a gate film GF, and one side of the gate film GF may be electrically connected with the display panel 110. Lines for electrically connecting the gate driving integrated circuit GDIC and the display panel 110 may be disposed on the gate film GF.

Likewise, one or more source driving integrated circuits SDIC included in the data driving circuit 130 each may be mounted on the source film SF, and one side of the source film SF may be electrically connected with the display panel 110. Lines for electrically connecting the source driver integrated circuit SDIC and the display panel 110 may be disposed on the source film SF.

The display device 100 may include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted may be connected to at least one source printed circuit board SPCB. In other words, one side of the source film SF where the source driving integrated circuit SDIC is mounted may be electrically connected with the display panel 110, and the other side thereof may be electrically connected with the source printed circuit board SPCB.

The timing controller 140 and the power management circuit 150 may be mounted on the control printed circuit board CPCB. The timing controller 140 may control the operation of the data driving circuit 130 and the gate driving circuit 120. The power management circuit 150 may supply driving voltage or current to the display panel 110, the data driving circuit 130, and the gate driving circuit 120 and control the supplied voltage or current.

At least one source printed circuit board SPCB and control printed circuit board CPCB may be circuit-connected through at least one connection member. The connection member may include, e.g., a flexible printed circuit FPC or a flexible flat cable FFC. In this case, the connection member connecting the at least one source printed circuit board SPCB and control printed circuit board CPCB may be varied depending on the size and type of the display device 100. The at least one source printed circuit board SPCB and control printed circuit board CPCB may be integrated into a single printed circuit board.

In the so-configured display device 100, the power management circuit 150 transfers a driving voltage necessary for display driving or characteristic value sensing to the source printed circuit board SPCB through the flexible printed circuit FPC or flexible flat cable FFC. The driving voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 may include an organic light emitting diode, which is a light emitting element, and a circuit element, e.g., a driving transistor, for driving the organic light emitting diode.

The type and number of circuit elements constituting each subpixel SP may be varied depending on functions to be provided and design schemes.

Figure 3:
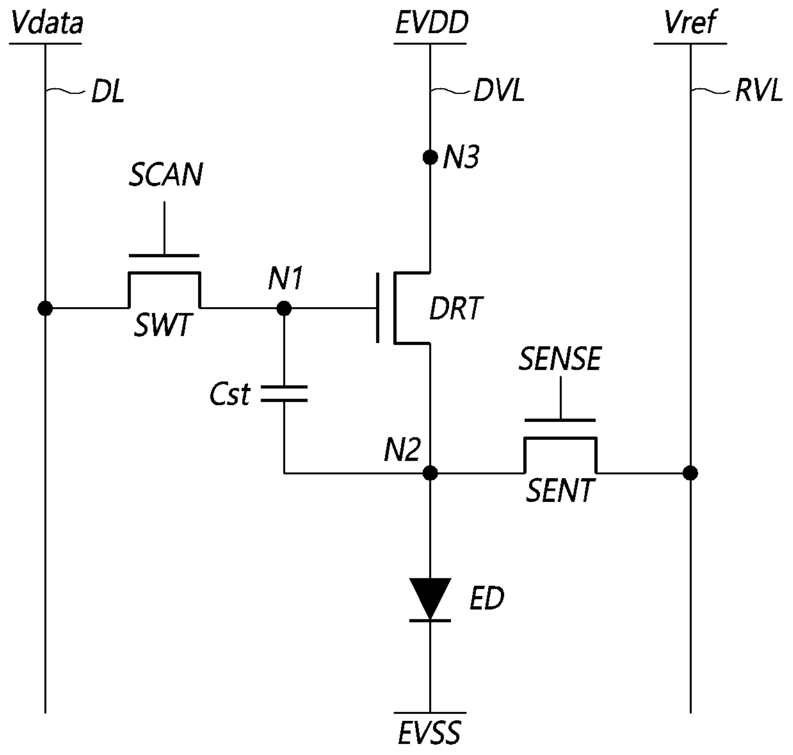
FIG. 3 is a view illustrating an example of a circuit constituting a subpixel in a display device according to embodiments of the disclosure.

FIG. 3 is a view illustrating an example of a circuit constituting a subpixel in a display device according to embodiments of the disclosure;

Referring to FIG. 3, in the display device 100 according to embodiments of the disclosure, the subpixel SP may include one or more transistors and a capacitor and an organic light emitting diode (OLED) as a light emitting element ED.

For example, the subpixel SP may include a driving transistor DRT, a switching transistor SWT, a sensing transistor SENT, a storage capacitor Cst, and a light emitting element ED.

The driving transistor DRT includes the first node N1, second node N2, and third node N3. The first node N1 of the driving transistor DRT may be a gate node to which the data voltage Vdata is applied from the data driving circuit 130 through the data line DL when the switching transistor SWT is turned on. The second node N2 of the driving transistor DRT may be electrically connected with the anode electrode of the light emitting element ED and may be the source node or drain node. The third node N3 of the driving transistor DRT may be electrically connected with the driving voltage line DVL to which the driving voltage EVDD is applied and may be the drain node or the source node.

In this case, during a display driving period, a driving voltage EVDD necessary for displaying an image may be supplied to the driving voltage line DVL. For example, the driving voltage EVDD necessary for displaying an image may be 27V.

The switching transistor SWT is electrically connected between the first node N1 of the driving transistor DRT and the data line DL, and the gate line GL is connected to the gate node. Thus, the switching transistor SWT is operated according to the scan signal SCAN supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the sense signal SENSE supplied through the gate line GL. When the sensing transistor SENT is turned on, a sensing reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the light emitting element ED may be supplied.

The gate nodes of the switching transistor SWT and the sensing transistor SENT may be commonly connected to one gate line GL or may be connected to different gate lines GL. An example is shown in which the switching transistor SWT and the sensing transistor SENT are connected to different gate lines GL in which case the switching transistor SWT and the sensing transistor SENT may be independently controlled by the scan signal SCAN and the sense signal SENSE transferred through different gate lines GL.

In contrast, if the switching transistor SWT and the sensing transistor SENT are connected to one gate line GL, the switching transistor SWT and the sensing transistor SENT may be simultaneously controlled by the scan signal SCAN or sense signal SENSE transferred through one gate line GL, and the aperture ratio of the subpixel SP may be increased.

The transistor disposed in the subpixel SP may be an n-type transistor or a p-type transistor and, in the shown example, the transistor is an n-type transistor.

The storage capacitor Cst is electrically connected between the first node N1 and second node N2 of the driving transistor DRT and maintains the data voltage Vdata during one frame.

The storage capacitor Cst may also be connected between the first node N1 and third node N3 of the driving transistor DRT depending on the type of the driving transistor DRT. The anode electrode of the light emitting element ED may be electrically connected with the second node N2 of the driving transistor DRT, and a base voltage EVSS may be applied to the cathode electrode of the light emitting element ED.

The base voltage EVSS may be a ground voltage or a voltage higher or lower than the ground voltage. The base voltage EVSS may vary depending on the driving state. For example, the base voltage EVSS at the time of display driving and the base voltage EVSS at the time of sensing driving may be set to differ from each other.

The structure of the subpixel SP described above as an example is a 3T (transistor) 1C (capacitor) structure, which is merely an example for description, and may further include one or more transistors or, in some cases, one or more capacitors. The plurality of subpixels SP may have the same structure, or some of the plurality of subpixels SP may have a different structure.

Figure 4:
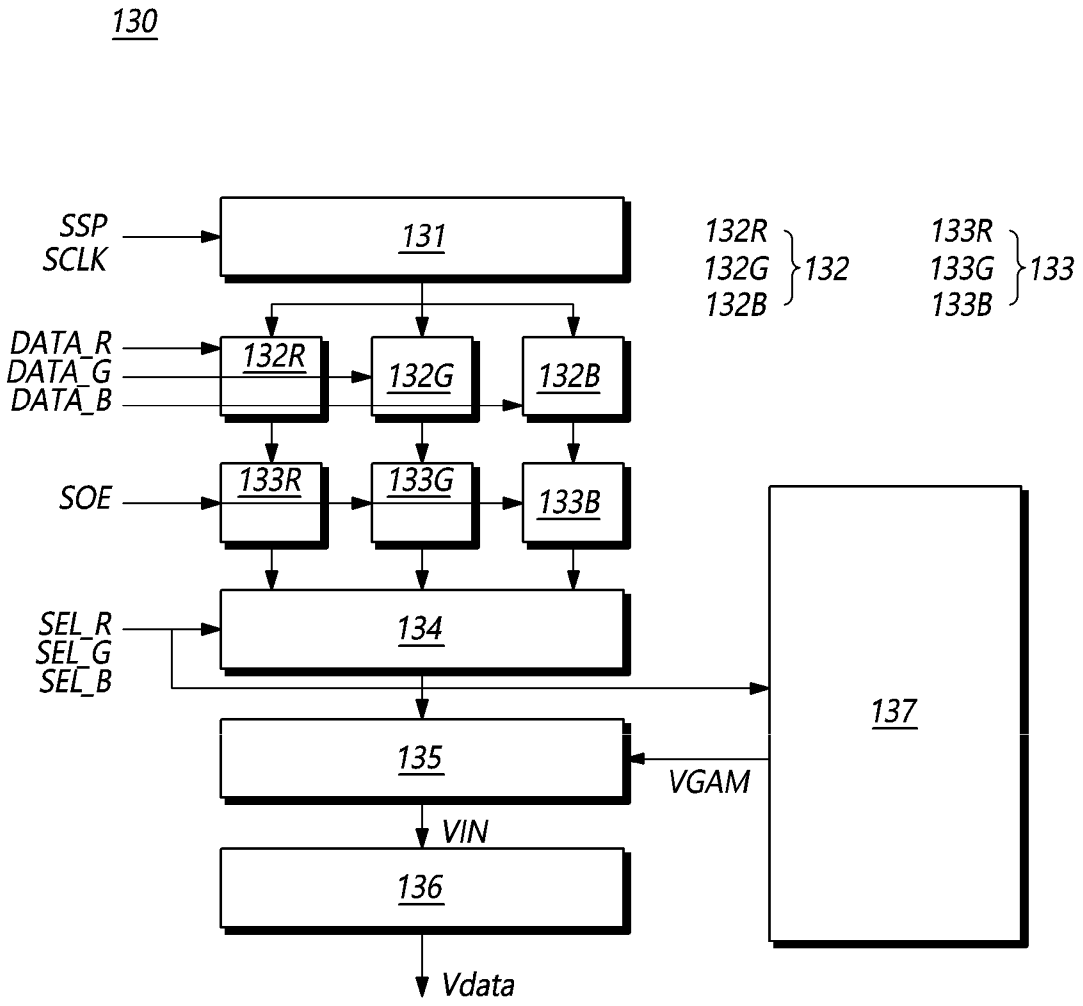
FIG. 4 is a block diagram illustrating a data driving circuit constituting a display device.

FIG. 4 is a block diagram illustrating a data driving circuit constituting a display device.

Referring to FIG. 4, a data driving circuit 130 of a display device 100 may include a shift register 131, a sampling latch circuit 132, a holding latch circuit 133, a multiplexer 134, a decoder 135, an output buffer 136, and a gamma circuit 137.

In this case, the gamma circuit 137 may be located inside the data driving circuit 130 or outside the data driving circuit 130. An example in which the gamma circuit 137 is located inside the data driving circuit 130 is illustrated.

The control signal transferred from the timing controller 140 to control the data driving circuit 130 may include a source start pulse SSP, a source clock SCLK, and a source output enable signal SOE.

The source start pulse SSP controls the data sampling start time of the data driving circuit 130. The source clock SCLK is a clock signal that controls the image data sampling operation in the data driving circuit 130 based on a rising or falling edge. The source output enable signal SOE controls the output of the data driving circuit 130.

The shift register 131 generates a sampling signal in response to the source start pulse SSP and source clock SCLK transferred from the timing controller 140.

The sampling latch circuits 132R, 132G, and 132B sequentially sample the image data DATA supplied from the timing controller 140 via the data bus line according to the sampling signal and supply it to the holding latch circuits 133R, 133G, and 133B.

When a pixel of the display panel 110 comprises three subpixels: a red subpixel, a green subpixel, and a blue subpixel, the sampling latch circuits 132R, 132G, and 132B include a first sampling latch circuit 132R that samples red color image data DATA_R, a second sampling latch circuit 132G that samples green color image data DATA_G, and a third sampling latch circuit 132B that samples blue color image data DATA_B.

The first sampling latch circuit 132R to the third sampling latch circuit 132B each sample the image data of its corresponding color.

The holding latch circuits 133R, 133G, and 133B store the image data DATA sampled by the sampling latch circuits 132R, 132G, and 132B in 1-line units, and supply the stored 1-line image data DATA to the multiplexer 134 in synchronization with the source output enable signal SOE.

In this case, the holding latch circuits 133R, 133G, and 133B may include a first holding latch circuit 133R storing red color image data DATA_R, a second holding latch circuit 133G storing green color image data DATA_G, and a third holding latch circuit 133B storing blue color image data DATA_B to correspond to the sampling latch circuits 132R, 132G, and 132B.

The multiplexer 134 selects the image data of the corresponding color according to the color selection signals SEL_R, SEL_G, and SEL_B and supplies it to the decoder 135.

In this case, the gamma circuit 137 uses the color selection signals SEL_R, SEL_G, and SEL_B to generate a gamma voltage VGAM that is used for the image data of the corresponding color and supplies it to the decoder 135.

The decoder 135 converts the one line of image data DATA into an analog input voltage VIN in response to the gamma voltage VGAM transferred by the gamma circuit 137.

The output buffer 136 amplifies or compensates for the analog input voltage VIN transferred from the decoder 135 and supplies a data voltage Vdata to the corresponding data line DL.

Figure 5:
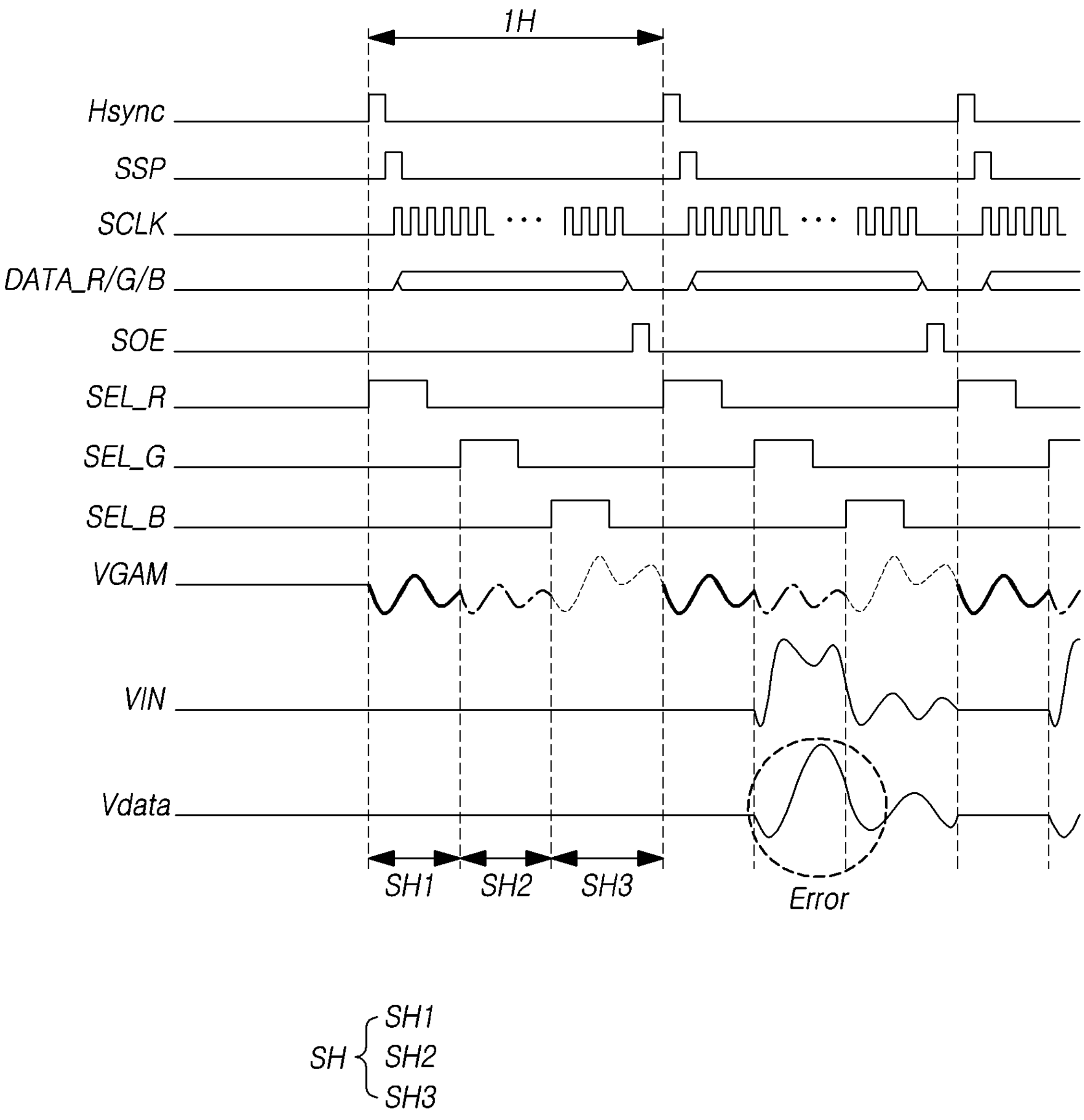
FIG. 5 is a signal waveform diagram illustrating an example in which green color image data is supplied through a data driving circuit constituting a display device.

FIG. 5 is a signal waveform diagram illustrating an example in which green-colored image data is supplied through a data driving circuit constituting a display device.

Referring to FIG. 5, in the data driving circuit 130, one horizontal period 1H during which a data voltage Vdata is applied to the display panel 110 by a horizontal synchronization signal Hsync may be determined.

When the display panel 110 comprises red subpixels, green subpixels, and blue subpixels, red color image data DATA_R, green color image data DATA_G, and blue color image data DATA_B may be applied during one horizontal period 1H. Thus, the horizontal period 1H may include a first sub-period SH1 in which the red color image data DATA_R is applied, a second sub-period SH2 in which the green color image data DATA_G is applied, and a third sub-period SH3 in which the blue color image data DATA_B is applied. In other words, when the display panel 110 comprises red subpixels, green subpixels, and blue subpixels, the sub-period SH may be set to a time interval equal to ⅓ of the one horizontal period 1H.

In this case, since the sampling latch circuits 132R, 132G, and 132B comprise a first sampling latch circuit 132R for sampling red color image data DATA_R, a second sampling latch circuit 132G for sampling green color image data DATA_G, and a third sampling latch circuit 132B for sampling blue color image data DATA_B, the shift register 131 may supply the red color image data DATA_R, the green color image data DATA_G, and the blue color image data DATA_B to the first sampling latch circuit 132R, the second sampling latch circuit 132G, and the third sampling latch circuit 132B, respectively, according to the source start pulse SSP supplied based on the one horizontal period 1H.

In this case, the color selection signals SEL_R, SEL_G, and SEL_B may comprise a red color selection signal SEL_R that determines a first sub-period SH1 in which red color image data DATA_R is supplied, a green color selection signal SEL_G that determines a second sub-period SH2 in which green color image data DATA_G is supplied, and a blue color selection signal SEL_B that determines a third sub-period SH3 in which blue color image data DATA_B is supplied.

Thus, the output buffer 136 may supply the data voltage Vdata of the corresponding color to the display panel 110 during each of the sub-periods SH1, SH2, and SH3, according to the color selection signals SEL_R, SEL_G, and SEL_B. In the shown example, a green colored data voltage Vdata is applied.

However, the gamma circuit 137 may take time for the gamma voltage VGAM to stabilize whenever the color changes while generating the gamma voltage VGAM. When the display panel 110 displays a high resolution or operates at a high speed, the time interval of the sub-period SH may be shortened so that it may be impossible to secure a sufficient time for the gamma voltage VGAM to stabilize. In such cases, the display panel 110 may experience degradation in image quality, such as horizontal line artifacts.

The display device of the disclosure disposes a plurality of gamma circuits in the data driving circuit and sequentially provides gamma voltages using a plurality of gamma circuits, thereby securing a stabilization time for the gamma voltage and enhancing image quality.

Figure 6:
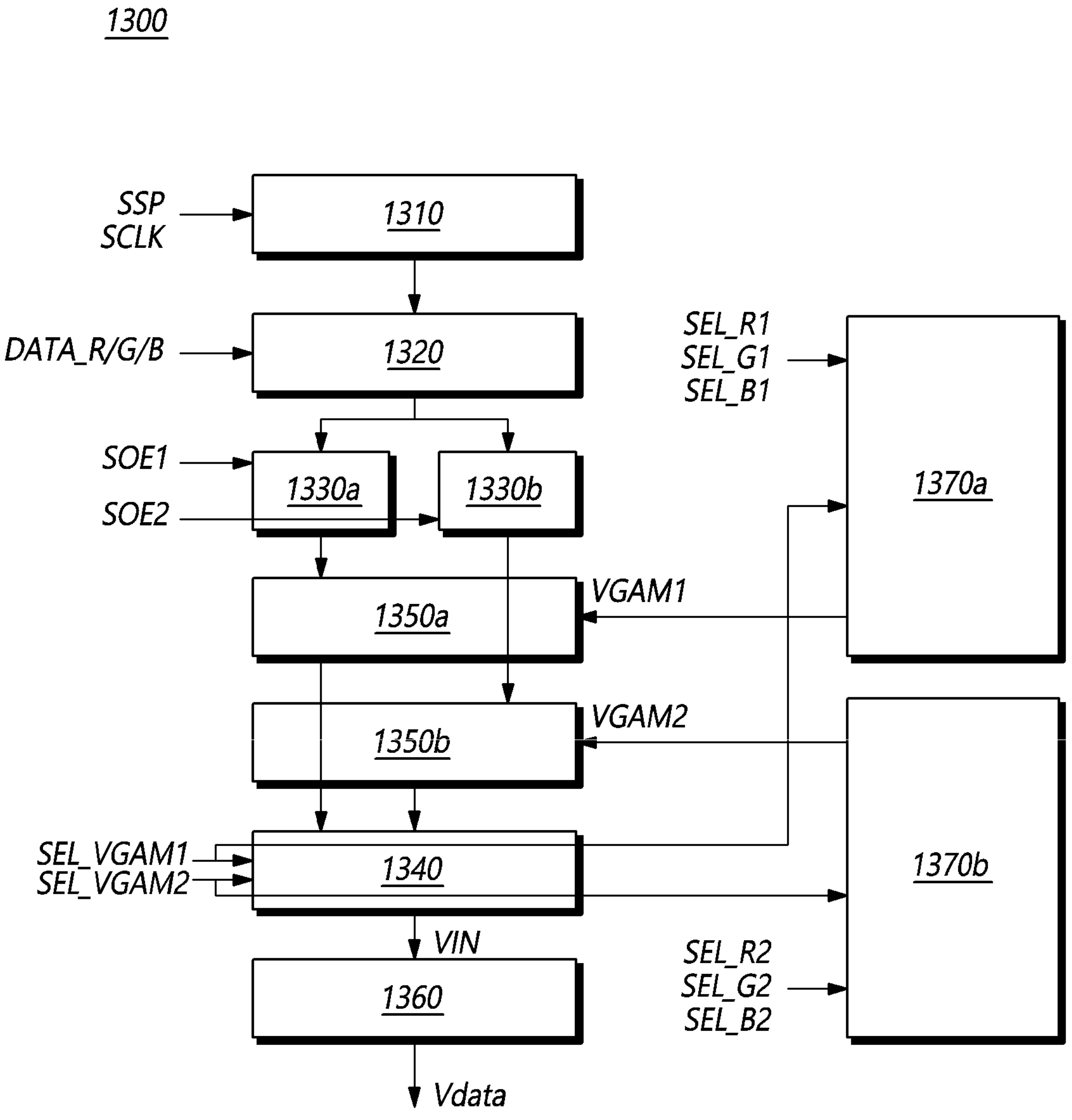
FIG. 6 is a block diagram illustrating an example data driving circuit of a display device according to embodiments of the disclosure.

FIG. 6 is a block diagram illustrating an example data driving circuit of a display device according to embodiments of the disclosure.

Referring to FIG. 6, a data driving circuit 1300 of a display device 100 according to embodiments of the disclosure may include a shift register 1310, a common sampling latch circuit 1320, a first holding latch circuit 1330*a*, a second holding latch circuit 1330*b*, a first decoder 1350*a*, a second decoder 1350*b*, a multiplexer 1340, an output buffer 1360, a first gamma circuit 1370*a*, and a second gamma circuit 1370*b*.

In this case, the first gamma circuit 1370*a* and the second gamma circuit 1370*b* may be located inside the data driving circuit 1300 or outside the data driving circuit 1300. An example in which the first and second gamma circuits 1370*a* and 1370*b* are located inside the data driving circuit 1300 is illustrated.

The data driving circuit control signal transferred from the timing controller 140 to control the data driving circuit 1300 may include a source start pulse SSP, a source clock SCLK, and source output enable signals SOE1 and SOE2.

The source start pulse SSP controls the data sampling start time of the data driving circuit 1300. The source clock SCLK is a clock signal that controls the image data sampling operation in the data driving circuit 1300 based on a rising or falling edge. The source output enable signals SOE and SOE2 control the output of the data driving circuit 1300.

The shift register 1310 generates a sampling signal in response to the source start pulse SSP and source clock SCLK transferred from the timing controller 140.

The common sampling latch circuit 1320 sequentially samples the image data DATA supplied from the timing controller 140 via the data bus line according to the sampling signal and supplies it to both the first holding latch circuit 1330*a* and the second holding latch circuit 1330*b*.

Since the display device 100 of the disclosure supplies, e.g., alternatively, a first gamma voltage VGAM1 and a second gamma voltage VGAM2 using the first gamma circuit 1370*a* and the second gamma circuit 1370*b*, a stabilization time of the gamma voltages VGAM1 and VGAM2 may be secured by maintaining the image data DATA of a color during two sub-periods.

Therefore, it is not necessary to individually sample the red color image data DATA_R, the green color image data DATA_G, and the blue color image data DATA_B supplied by the timing controller 140, and the red color image data DATA_R, the green color image data DATA_G, and the blue color image data DATA_B may be sampled using the common sampling latch circuit 1320.

The first holding latch circuit 1330*a* stores the image data DATA_R/G/B sampled by the common sampling latch circuit 1320, in 1 line units, and supplies the stored 1 line of image data to the first decoder 1350*a* in synchronization with the first source output enable signal SOE1.

The first decoder 1350*a* converts the 1 line of image data DATA into an analog voltage in response to the first gamma voltage VGAM1 transferred from the first gamma circuit 1370*a*.

The second holding latch circuit 1330*b* stores the image data DATA_R/G/B sampled by the common sampling latch circuit 1320, in 1 line units, and supplies the stored 1 line of image data to the second decoder 1350*b* in synchronization with the second source output enable signal SOE2.

The second decoder 1350*b* converts the 1 line of image data DATA into an analog voltage in response to the second gamma voltage VGAM2 transferred from the second gamma circuit 1370*b*.

The first source output enable signal SOE1 and the second source output enable signal SOE2 may each be set to be applied at the end of the first sub-period for the stabilization operation, of the two sub-periods in which the image data of a particular color is maintained.

The first gamma circuit 1370*a* and the second gamma circuit 1370*b* may generate gamma voltages VGAM1 and VGAM2 corresponding to different pixels. For example, the first gamma circuit 1370*a* may generate a first gamma voltage VGAM1 corresponding to an odd-numbered pixel, and the second gamma circuit 1370*b* may generate a second gamma voltage VGAM2 corresponding to an even-numbered pixel.

The first gamma circuit 1370*a* maintains the image data of the corresponding color during a period corresponding to the first color selection signal SEL_R1, SEL_G1, or SEL_B1, and supplies a first gamma voltage VGAM1 of the corresponding color to the first decoder 1350*a* by the first gamma selection signal SEL_VGAM1.

The second gamma circuit 1370*b* maintains the image data of the corresponding color during a period corresponding to the second color selection signal SEL_R2, SEL_G2, or SEL_B2, and supplies a second gamma voltage VGAM2 of the corresponding color to the second decoder 1350*b* by the second gamma selection signal SEL_VGAM2.

In this case, the first color selection signal SEL_R1, SEL_G1, or SEL_B1 and the second color selection signal SEL_R2, SEL_G2, or SEL_B2 may also be maintained during two sub-periods, taking into account the stabilization period of the gamma voltage VGAM1 or VGAM2.

The multiplexer 1340 selects the image data corresponding to the corresponding gamma voltages VGAM1 and VGAM2 according to the first gamma select signal SEL_VGAM1 and the second gamma select signal SEL_VGAM2 and supplies it to the output buffer 1360.

The output buffer 1360 amplifies or compensates for the analog input voltage VIN transferred from the multiplexer 1340, generating a data voltage Vdata and supplying it to the corresponding data line DL.

Figure 7:
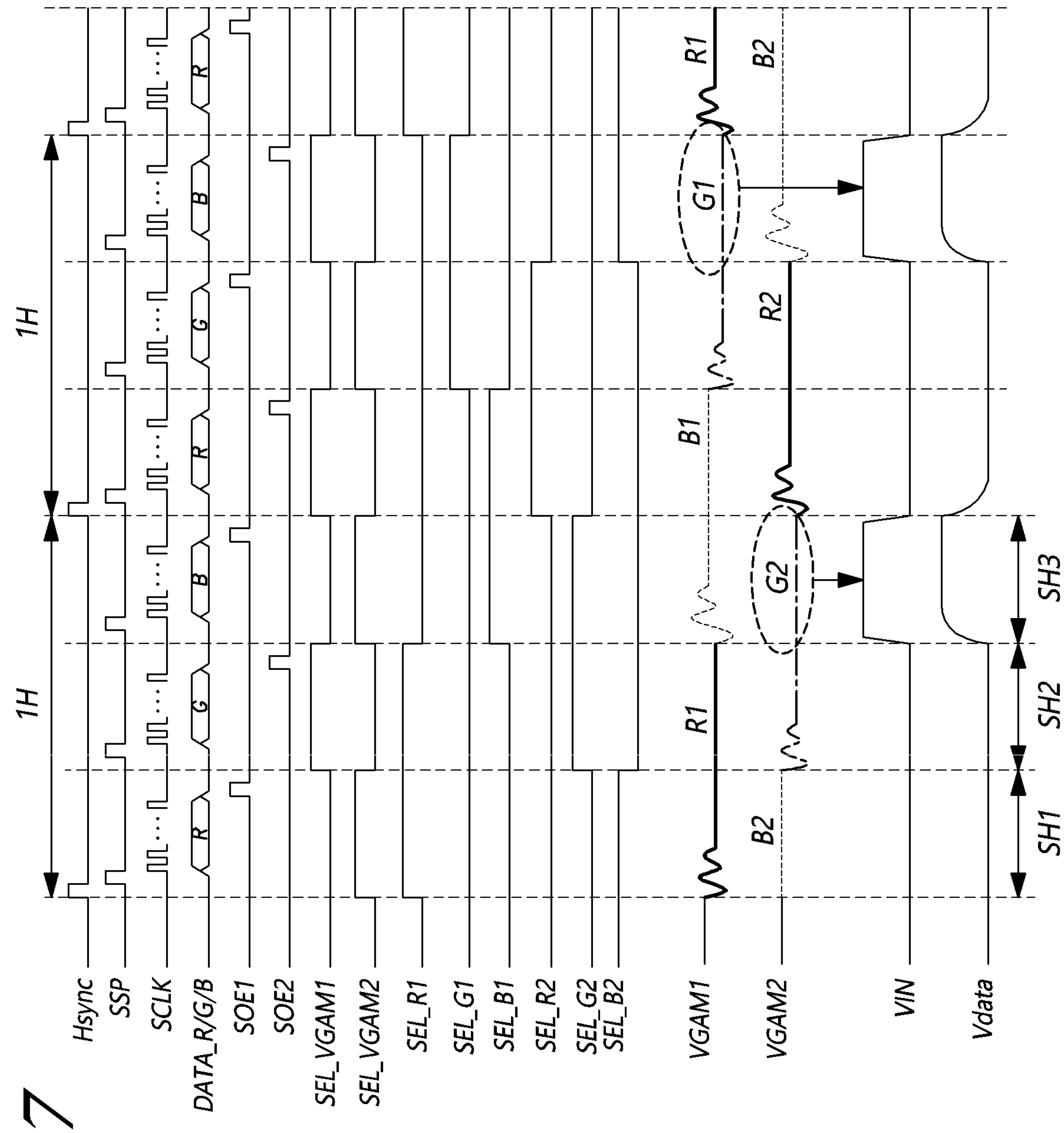
FIGS. 7 and 8 are signal waveform diagrams illustrating an example in which green color image data is supplied through a data driving circuit of a display device according to embodiments of the disclosure.
Figure 8:
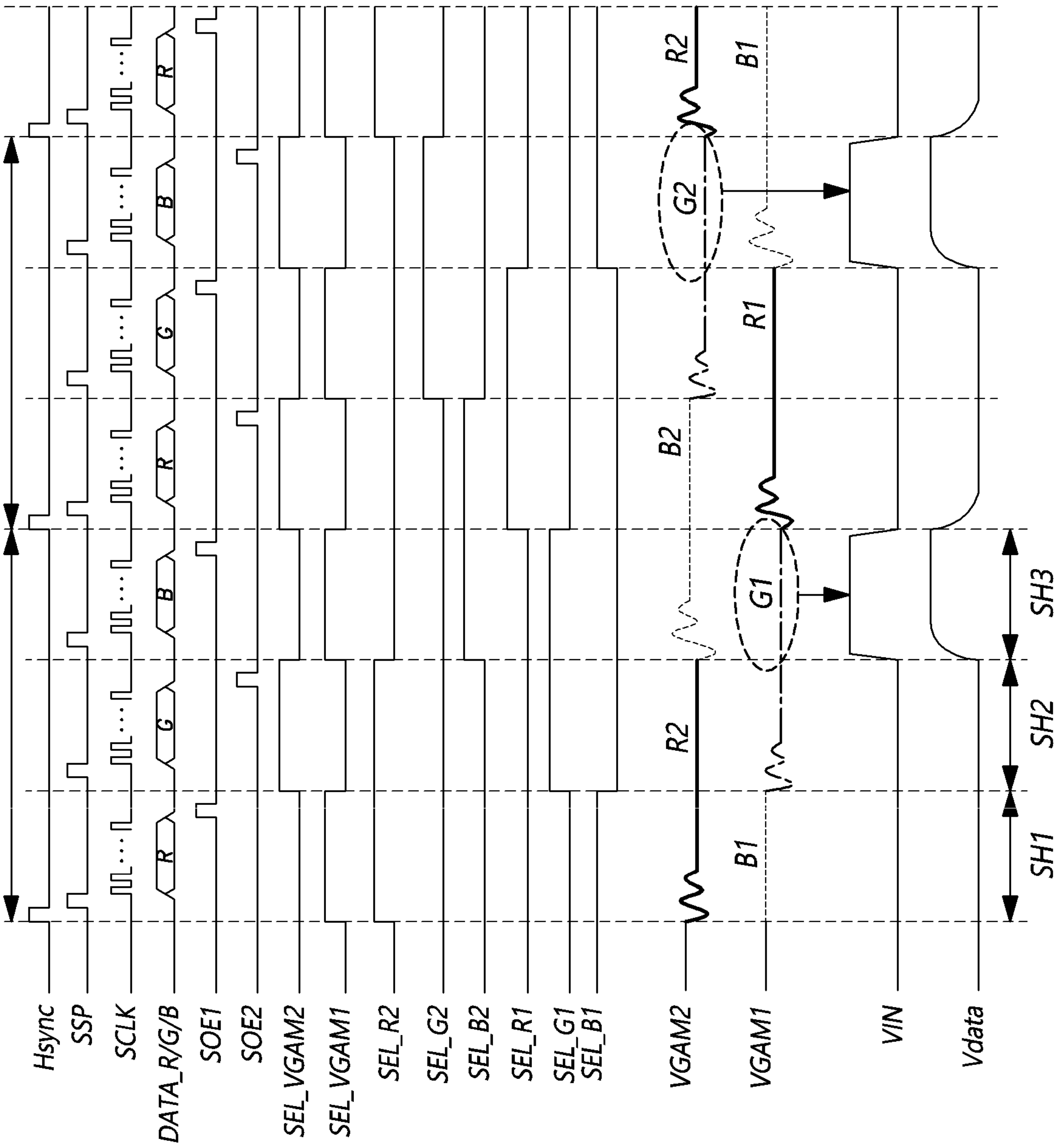

FIGS. 7 and 8 are signal waveform diagrams illustrating an example in which green-colored image data is supplied through a data driving circuit of a display device according to embodiments of the disclosure.

Referring to FIG. 7, in the data driving circuit 1300 according to embodiments of the disclosure, one horizontal period 1H during which a data voltage Vdata is applied to the display panel 110 by a horizontal synchronization signal Hsync may be determined.

When the display panel 110 comprises red subpixels, green subpixels, and blue subpixels, red color image data DATA_R, green color image data DATA_G, and blue color image data DATA_B may be applied during one horizontal period 1H. Thus, the horizontal period 1H may include a first sub-period SH1 in which the red color image data DATA_R is applied, a second sub-period SH2 in which the green color image data DATA_G is applied, and a third sub-period SH3 in which the blue color image data DATA_B is applied. In other words, when the display panel 110 comprises red subpixels, green subpixels, and blue subpixels, the one sub-period SH may be set to a time interval equal to ⅓ of the one horizontal period 1H.

Since the display device 100 of the disclosure alternately supplies a first gamma voltage VGAM1 and a second gamma voltage VGAM2 using the first gamma circuit 1370*a* and the second gamma circuit 1370*b*, a stabilization time of the gamma voltages VGAM1 and VGAM2 may be secured by maintaining the image data DATA of a particular color during two sub-periods.

For example, the first source output enable signal SOE1 supplied to the first holding latch circuit 1330*a* and the second source output enable signal SOE2 supplied to the second holding latch circuit 1330*b* may be alternately applied every two sub-period interval during which the image data is maintained.

The first color selection signals SEL_R1, SEL_G1, and SEL_B1 may comprise a red color selection signal SEL_R1 to select red color image data DATA_R, a green color selection signal SEL_G1 to select green color image data DATA_G, and a blue color selection signal SEL_B1 to select blue color image data DATA_B.

Further, the second color selection signals SEL_R2, SEL_G2, and SEL_B2 may comprise a red color selection signal SEL_R2 to select red color image data DATA_R, a green color selection signal SEL_G2 to select green color image data DATA_G, and a blue color selection signal SEL_B2 to select blue color image data DATA_B.

In this case, the first color selection signal SEL_R1, SEL_G1, and SEL_B1 and the second color selection signal SEL_R2, SEL_G2, and SEL_B2 may be maintained during two sub-periods, respectively, considering the stabilization period of the gamma voltage VGAM1 and VGAM2.

Thus, the output buffer 1360 may supply the data voltage Vdata of the corresponding color by the source output enable signal SOE1, SOE2 to the display panel 110 for one sub-period, with a sufficient stabilization period of the gamma voltage VGAM1, VGAM2 by the color selection signals SEL_R1, SEL_G1, SEL_B1, SEL_R2, SEL_G2, SEL_B2 which are maintained during two sub-periods. In the illustrated example, a green color data voltage Vdata is supplied to the display panel 110.

As a result, the display device 100 of the disclosure may minimize image artifacts due to high-resolution and high-speed processing and enhance image quality by securing a stabilization time of the gamma voltages VGAM1 and VGAM2.

Meanwhile, since the display device 100 of the disclosure utilizes the first gamma circuit 1370*a* and the second gamma circuit 1370*b* together in one data driving circuit 1300, an offset deviation may occur between the first gamma voltage VGAM1 output from the first gamma circuit 1370*a* and the second gamma voltage VGAM2 output from the second gamma circuit 1370*b*.

In some implementations, the order of driving the first gamma circuit 1370*a* and the second gamma circuit 1370*b* may be changed on basis of data line or on basis of frame in which the image data is displayed on the display panel 110, which can reduce the offset deviation.

For example, if the signal waveform shown in FIG. 7 is a signal waveform of the data driving circuit 1300 operating in odd-numbered frames, the data driving circuit 1300 operating in even-numbered frames may reverse the order of driving the first gamma circuit 1370*a* and second gamma circuit 1370*b*.

In this case, the data driving circuit 1300 of the disclosure may operate as in the signal waveform illustrated in FIG. 8.

Reversing the order of driving the first gamma circuit 1370*a* and the second gamma circuit 1370*b* may be accomplished, for example, by changing the order of driving the gamma selection signals SEL_VGAM1 and SEL_VGAM2 and the color selection signals SEL_R1, SEL_G1, SEL_B1, SEL_R2, SEL_G2, and SEL_B2.

Further, it is possible to downsize the data driving circuit 1300 by configuring the holding latch circuits of the data driving circuit 1300 of the disclosure as a common structure.

Figure 9:
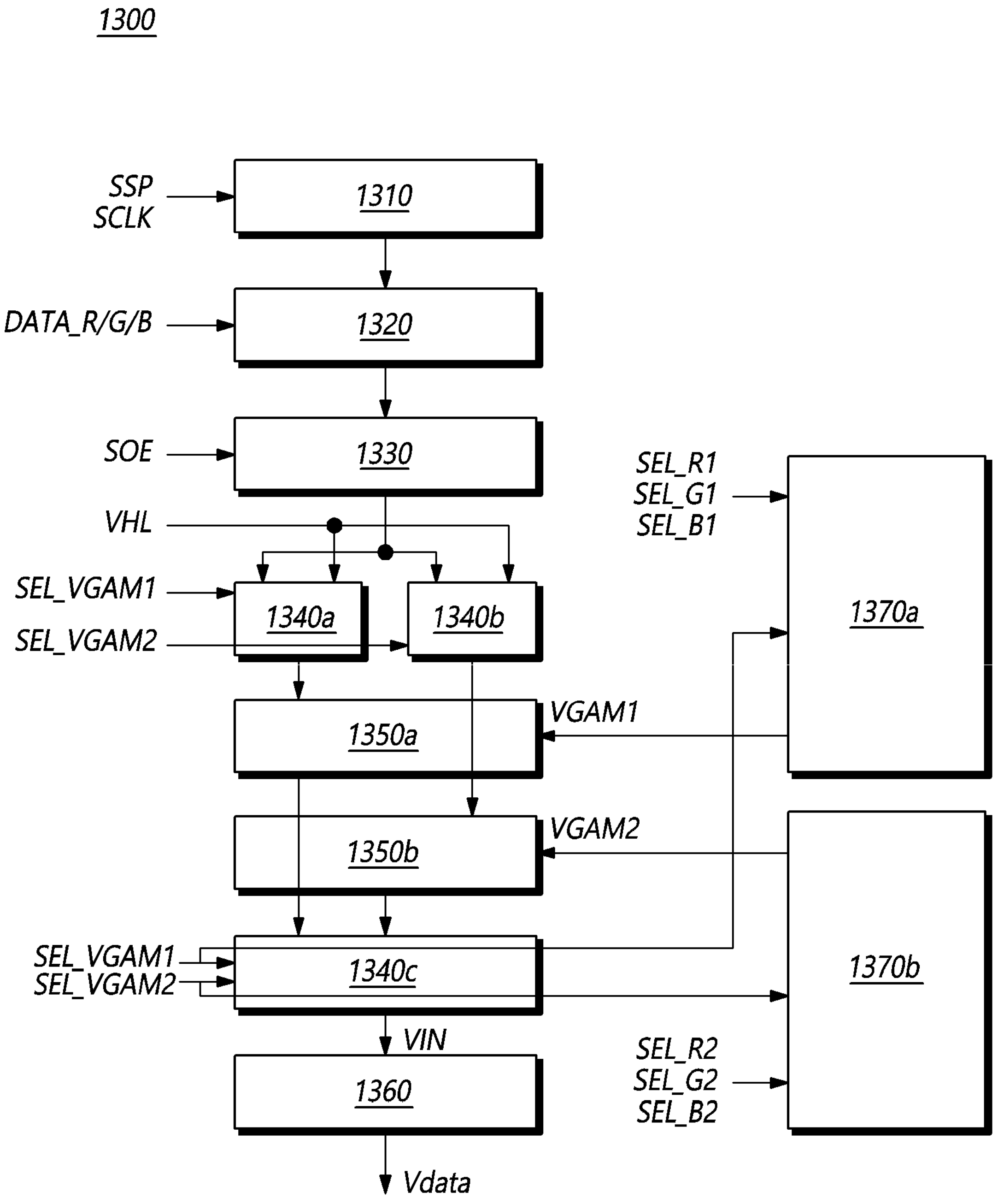
FIG. 9 is a block diagram illustrating an example data driving circuit of a display device according to other embodiments of the disclosure.

FIG. 9 is a block diagram illustrating an example data driving circuit of a display device according to other embodiments of the disclosure.

Referring to FIG. 9, a data driving circuit 1300 of a display device 100 according to other embodiments of the disclosure may include a shift register 1310, a common sampling latch circuit 1320, a common holding latch circuit 1330, a first multiplexer 1340*a*, a second multiplexer 1340*b*, a first decoder 1350*a*, a second decoder 1350*b*, a third multiplexer 1340*c*, an output buffer 1360, a first gamma circuit 1370*a*, and a second gamma circuit 1370*b*.

In this case, the first gamma circuit 1370*a* and the second gamma circuit 1370*b* may be located inside the data driving circuit 1300 or outside the data driving circuit 1300. An example in which the first and second gamma circuits 1370*a* and 1370*b* are located inside the data driving circuit 1300 is illustrated.

The data driving circuit control signal transferred from the timing controller 140 to control the data driving circuit 1300 may include a source start pulse SSP, a source clock SCLK, and a source output enable signal SOE.

The source start pulse SSP controls the data sampling start time of the data driving circuit 1300. The source clock SCLK is a clock signal that controls the image data sampling operation in the data driving circuit 1300 based on a rising or falling edge. The source output enable signal SOE controls the output of the data driving circuit 1300.

The shift register 1310 generates a sampling signal in response to the source start pulse SSP and source clock SCLK transferred from the timing controller 140.

The common sampling latch circuit 1320 sequentially samples the image data DATA supplied from the timing controller 140 via the data bus line according to the sampling signal and supplies it to the common holding latch circuit 1330.

Since the size of the latch circuit is typically much larger than the size of the multiplexer, the size of the data driving circuit 1300 may be significantly reduced when image data for multiple colors is processed by one common holding latch circuit 1330.

Since the display device 100 of the disclosure alternately supplies a first gamma voltage VGAM1 and a second gamma voltage VGAM2 using the first gamma circuit 1370*a* and the second gamma circuit 1370*b*, a stabilization time of the gamma voltages VGAM1 and VGAM2 may be secured by maintaining the image data DATA of a particular color during two sub-periods.

Therefore, it is not necessary to individually sample the red color image data DATA_R, the green color image data DATA_G, and the blue color image data DATA_B supplied by the timing controller 140, and the red color image data DATA_R, the green color image data DATA_G, and the blue color image data DATA_B may be sampled using the common sampling latch circuit 1320.

The data driving circuit 1300 of the disclosure may hold the red color image data DATA_R, the green color image data DATA_G, and the blue color image data DATA_B using the common holding latch circuit 1330 instead of individually holding the red color image data DATA_R, the green color image data DATA_G, and the blue color image data DATA_B.

The common holding latch circuit 1330 stores the image data DATA_R/G/B sampled by the common sampling latch circuit 1320, in 1 line units, and supplies the stored 1 line of image data to the first multiplexer 1340*a* and the second multiplexer 1340*b* in synchronization with the source output enable signal SOE.

The first multiplexer 1340*a* selects the image data corresponding to the first gamma voltage VGAM1 according to the first gamma selection signal SEL_VGAM1 and supplies it to the first decoder 1350*a*.

The second multiplexer 1340*b* selects the image data corresponding to the second gamma voltage VGAM2 according to the second gamma selection signal SEL_VGAM2 and supplies it to the second decoder 1350*b*.

In this case, the first multiplexer 1340*a* and the second multiplexer 1340*b* may be operated by the first gamma select signal SEL_VGAM1 and the second gamma select signal SEL_VGAM2. The first multiplexer 1340*a* may transfer image data corresponding to the first gamma voltage VGAM1 while the first gamma select signal SEL_VGAM1 is applied and corresponding to the holding latch voltage VHL while the first gamma select signal SEL_VGAM1 is not applied. Further, the second multiplexer 1340*b* may transfer image data corresponding to the second gamma voltage VGAM2 while the second gamma select signal SEL_VGAM2 is applied and corresponding to the holding latch voltage VHL while the second gamma select signal SEL_VGAM2 is not applied.

The holding latch voltage VHL may be set to a level that may reduce deviations in the signal supplied to the first decoder 1350*a* or the second decoder 1350*b*. For example, the holding latch voltage VHL may have a fixed level of a certain grayscale, such as 0 grayscale or 255 grayscale. The holding latch voltage VHL may also be set to the average of the grayscale of the image data displayed on the previous data line and the grayscale of the image data displayed on the current data line, reducing deviations due to fluctuations in the image data.

The first decoder 1350*a* converts 1 line of image data DATA into an analog voltage in response to the first gamma voltage VGAM1 transferred from the first gamma circuit 1370*a*.

The second decoder 1350*b* converts 1 line of image data DATA into an analog voltage in response to the second gamma voltage VGAM2 transferred from the second gamma circuit 1370*b*.

In this case, the source output enable signal SOE may be set to be applied every sub-period, such that image data of a color, e.g., one of R, G, or B colors, may be output in each sub-period.

The first gamma circuit 1370*a* and the second gamma circuit 1370*b* may generate gamma voltages VGAM1 and VGAM2 corresponding to different pixels. For example, the first gamma circuit 1370*a* may generate a first gamma voltage VGAM1 corresponding to an odd-numbered pixel, and the second gamma circuit 1370*b* may generate a second gamma voltage VGAM2 corresponding to an even-numbered pixel.

The first gamma circuit 1370*a* maintains the image data of the corresponding color during a period corresponding to the first color selection signal SEL_R1, SEL_G1, or SEL_B1, and supplies a first gamma voltage VGAM1 of the corresponding color to the first decoder 1350*a* by the first gamma selection signal SEL_VGAM1.

The second gamma circuit 1370*b* maintains the image data of the corresponding color during a period corresponding to the second color selection signal SEL_R2, SEL_G2, or SEL_B2, and supplies a second gamma voltage VGAM2 of the corresponding color to the second decoder 1350*b* by the second gamma selection signal SEL_VGAM2.

In this case, the first color selection signal SEL_R1, SEL_G1, or SEL_B1 and the second color selection signal SEL_R2, SEL_G2, or SEL_B2 may also be maintained during two sub-periods, taking into account the stabilization period of the gamma voltage VGAM1 or VGAM2.

The third multiplexer 1340*c* selects the image data corresponding to the corresponding gamma voltages VGAM1 and VGAM2 according to the first gamma select signal SEL_VGAM1 and the second gamma select signal SEL_VGAM2 and supplies it to the output buffer 1360.

The output buffer 1360 amplifies or compensates for the analog input voltage VIN transferred from the third multiplexer 1340*c*, generating a data voltage Vdata and supplying it to the corresponding data line DL.

Figure 10:
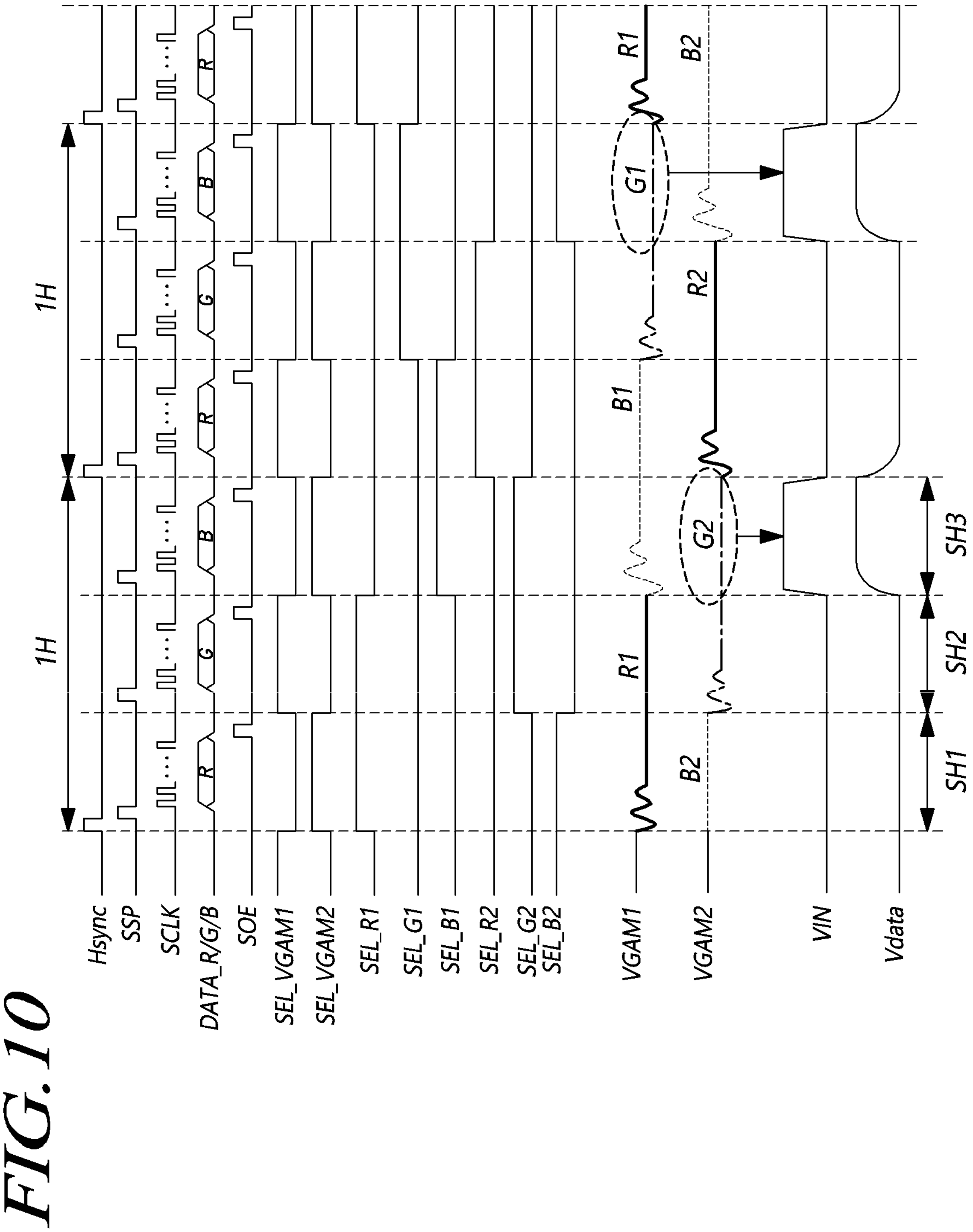
FIGS. 10 and 11 are signal waveform diagrams illustrating an example in which green color image data is supplied through a data driving circuit of a display device according to other embodiments of the disclosure.
Figure 11:
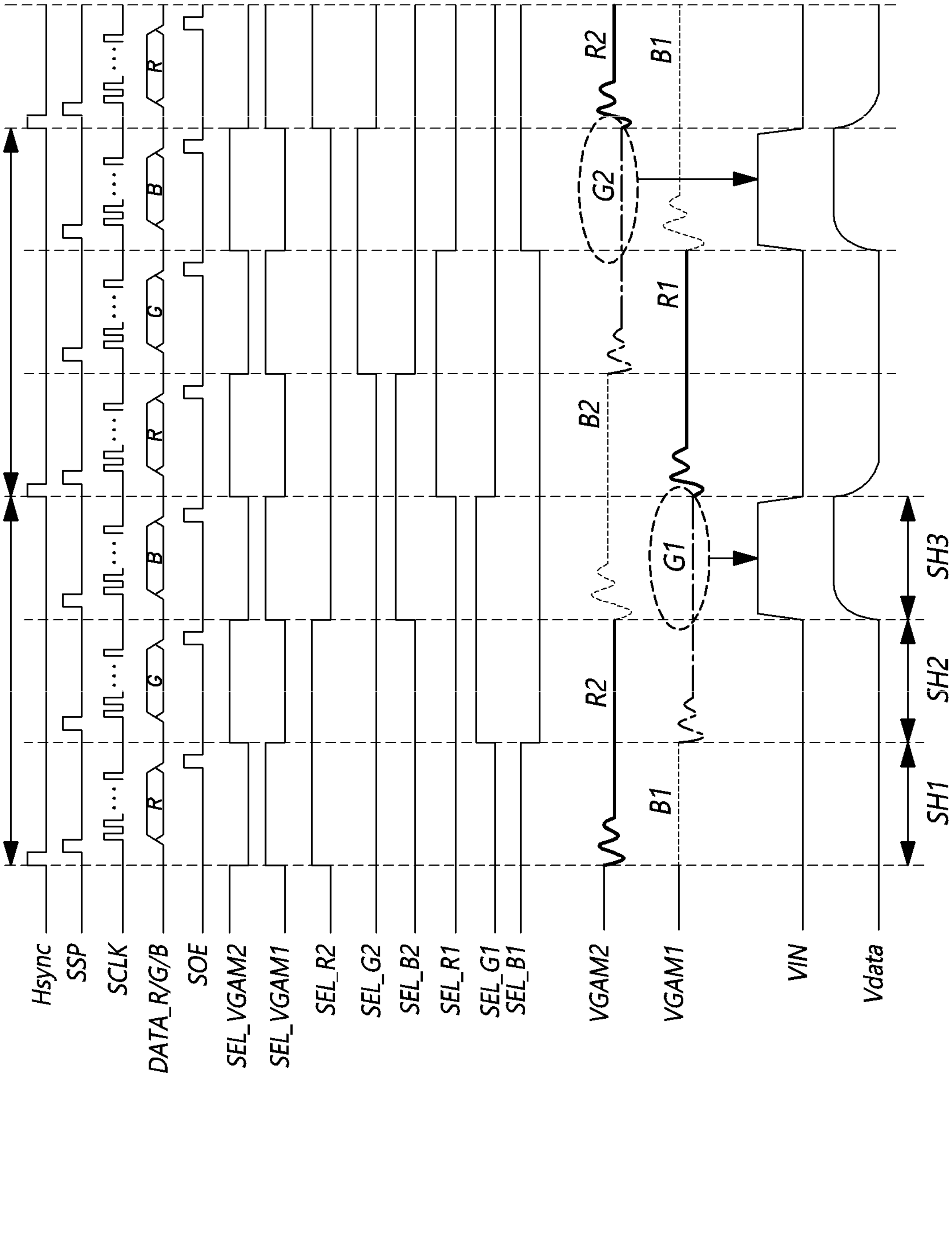

FIGS. 10 and 11 are signal waveform diagrams illustrating an example in which green-colored image data is supplied through a data driving circuit of a display device according to embodiments of the disclosure.

Referring to FIG. 10, in the data driving circuit 1300 according to embodiments of the disclosure, one horizontal period 1H during which a data voltage Vdata is applied to the display panel 110 by a horizontal synchronization signal Hsync may be determined.

When the display panel 110 comprises red subpixels, green subpixels, and blue subpixels, red color image data DATA_R, green color image data DATA_G, and blue color image data DATA_B may be applied during one horizontal period 1H. Thus, the horizontal period 1H may include a first sub-period SH1 in which the red color image data DATA_R is applied, a second sub-period SH2 in which the green color image data DATA_G is applied, and a third sub-period SH3 in which the blue color image data DATA_B is applied. In other words, when the display panel 110 comprises red subpixels, green subpixels, and blue subpixels, the one sub-period SH may be set to a time interval equal to ⅓ of the one horizontal period 1H.

Since the display device 100 of the disclosure alternately supplies a first gamma voltage VGAM1 and a second gamma voltage VGAM2 using the first gamma circuit 1370*a* and the second gamma circuit 1370*b*, a stabilization time of the gamma voltages VGAM1 and VGAM2 may be secured by maintaining the image data DATA of a particular color during two sub-periods.

The first color selection signals SEL_R1, SEL_G1, and SEL_B1 may comprise a red color selection signal SEL_R1 to select red color image data DATA_R, a green color selection signal SEL_G1 to select green color image data DATA_G, and a blue color selection signal SEL_B1 to select blue color image data DATA_B.

Further, the second color selection signals SEL_R2, SEL_G2, and SEL_B2 may comprise a red color selection signal SEL_R2 to select red color image data DATA_R, a green color selection signal SEL_G2 to select green color image data DATA_G, and a blue color selection signal SEL_B2 to select blue color image data DATA_B.

In this case, the first color selection signal SEL_R1, SEL_G1, and SEL_B1 and the second color selection signal SEL_R2, SEL_G2, and SEL_B2 may be maintained during two sub-periods, respectively, considering the stabilization period of the gamma voltage VGAM1 and VGAM2.

Thus, the output buffer 1360 may supply the data voltage Vdata of the corresponding color by the source output enable signal SOE to the display panel 110 for one sub-period, with a sufficient stabilization period of the gamma voltage VGAM1, VGAM2 by the color selection signals SEL_R1, SEL_G1, SEL_B1, SEL_R2, SEL_G2, SEL_B2 which are maintained during two sub-periods. In the illustrated example, a green color data voltage Vdata is supplied to the display panel 110.

As a result, the display device 100 of the disclosure may minimize image artifacts due to high-resolution and high-speed processing and enhance image quality by securing a stabilization time of the gamma voltages VGAM1 and VGAM2.

Meanwhile, since the display device 100 of the disclosure utilizes the first gamma circuit 1370*a* and the second gamma circuit 1370*b* together in one data driving circuit 1300, an offset deviation may occur between the first gamma voltage VGAM1 output from the first gamma circuit 1370*a* and the second gamma voltage VGAM2 output from the second gamma circuit 1370*b*.

In some implementations, the order of driving the first gamma circuit 1370*a* and the second gamma circuit 1370*b* may be changed on basis of data line or on basis of frame in which the image data is displayed on the display panel 110, which can reduce the offset deviation.

For example, if the signal waveform shown in FIG. 10 is a signal waveform of the data driving circuit 1300 operating in odd-numbered frames, the data driving circuit 1300 operating in even-numbered frames may reverse the order of driving the first gamma circuit 1370*a* and second gamma circuit 1370*b*.

In this case, the data driving circuit 1300 of the disclosure may operate as in the signal waveform illustrated in FIG. 11.

Reversing the order of driving the first gamma circuit 1370*a* and the second gamma circuit 1370*b* may be accomplished, for example, by changing the order of driving the gamma selection signals SEL_VGAM1 and SEL_VGAM2 and the color selection signals SEL_R1, SEL_G1, SEL_B1, SEL_R2, SEL_G2, and SEL_B2.

Some embodiments of the disclosure are also briefly described below.

A data driving circuit 1300 of the disclosure, driving a display panel 110 having pixels arranged in a matrix structure, each of the pixels including a plurality of subpixels SP may comprise a shift register 1310 configured to generate a sampling signal, a common sampling latch circuit 1320 configured to sequentially sample image data DATA according to the sampling signal, a first holding latch circuit 1330*a* configured to output the image data DATA sampled by the common sampling latch circuit 1320 in synchronization with a first source output enable signal SOE1, a second holding latch circuit 1330*b* configured to output the image data DATA sampled by the common sampling latch circuit 1320 in synchronization with a second source output enable signal SOE2, a first gamma circuit 1370*a* configured to generate a first gamma voltage VGAM1 corresponding to a first pixel during a period corresponding to a first color selection signal SEL_R1, SEL_G1, or SEL_B1, a second gamma circuit 1370*b* configured to generate a second gamma voltage VGAM2 corresponding to a second pixel during a period corresponding to a second color selection signal SEL_R2, SEL_G2, or SEL_B2 different from the first color selection signal SEL_R1, SEL_G1, or SEL_B1, a first decoder 1350*a* configured to convert the image data DATA transferred from the first holding latch circuit 1330*a* into an analog data voltage in response to the first gamma voltage VGAM1, a second decoder 1350*b* configured to convert the image data DATA transferred from the second holding latch circuit 1330*b* into an analog data voltage in response to the second gamma voltage VGAM2, a multiplexer 1340 configured to output an analog data voltage corresponding to the first gamma voltage VGAM1 or the second gamma voltage VGAM2 according to the first gamma selection signal SEL_VGAM1 and the second gamma selection signal SEL_VGAM2, and an output buffer 1360 configured to supply the analog data voltage to a corresponding data line DL.

The pixels may include a red subpixel, a green subpixel, and a blue subpixel. One horizontal period 1H driving a horizontal line of the display panel 110 may include a first sub-period SH1 for driving the red subpixel, a second sub-period SH2 for driving the green subpixel, and a third sub-period SH3 for driving the blue subpixel. The first source output enable signal SOE1 and the second source output enable signal SOE2 may be generated every two sub-period interval. The first color selection signal SEL_R1, SEL_G1, or SEL_B1 and the second color selection signal SEL_R2, SEL_G2, or SEL_B2 may be maintained in the two sub-period interval.

The first pixel may be an odd-numbered pixel, and the second pixel may be an even-numbered pixel.

The first gamma circuit 1370*a* and the second gamma circuit 1370*b* may change their driving order on basis of data line or on basis of frame.

A data driving circuit 1300 of the disclosure driving a display panel 110 having pixels arranged in a matrix structure, each of the pixels including a plurality of subpixels SP may comprise a shift register 1310 configured to generate a sampling signal, a common sampling latch circuit 1320 configured to sequentially sample image data DATA according to the sampling signal, a common holding latch circuit 1320 configured to output the image data DATA sampled by the common sampling latch circuit 1320 in synchronization with a source output enable signal, a first gamma circuit

1370*a* configured to generate a first gamma voltage VGAM1 corresponding to a first pixel during a period corresponding to a first color selection signal SEL_R1, SEL_G1, or SEL_B1, a second gamma circuit 1370*b* configured to generate a second gamma voltage VGAM2 corresponding to a second pixel during a period corresponding to a second color selection signal SEL_R2, SEL_G2, or SEL_B2 different from the first color selection signal SEL_R1, SEL_G1, or SEL_B1, a first multiplexer 1340*a* configured to output image data DATA corresponding to the first gamma voltage VGAM1 according to a first gamma selection signal SEL_VGAM1, a second multiplexer 1340*b* configured to output image data DATA corresponding to the second gamma voltage VGAM2 according to a second gamma selection signal SEL_VGAM2, a first decoder 1350*a* configured to convert the image data DATA transferred from the first multiplexer 1340*a* into an analog data voltage in response to the first gamma voltage VGAM1, a second decoder 1350*b* configured to convert the image data DATA transferred from the second multiplexer 1340*b* into an analog data voltage in response to the second gamma voltage VGAM2, a third multiplexer 1340*c* configured to output an analog data voltage corresponding to the first gamma voltage VGAM1 or the second gamma voltage VGAM2 according to the first gamma selection signal SEL_VGAM1 and the second gamma selection signal SEL_VGAM2, and an output buffer 1360 configured to supply the analog data voltage to a corresponding data line DL.

The pixels may include a red subpixel, a green subpixel, and a blue subpixel. One horizontal period 1H driving a horizontal line of the display panel 110 may include a first sub-period SH1 for driving the red subpixel, a second sub-period SH2 for driving the green subpixel, and a third sub-period SH3 for driving the blue subpixel. The first color selection signal SEL_R1, SEL_G1, or SEL_B1 and the second color selection signal SEL_R2, SEL_G2, or SEL_B2 may be maintained in the two sub-period intervals.

The first pixel may be an odd-numbered pixel, and the second pixel may be an even-numbered pixel.

The first gamma circuit 1370*a* and the second gamma circuit 1370*b* may change their driving order on basis of data line or on basis of frame.

The first multiplexer 1340*a* and the second multiplexer 1340*b* may be supplied with a holding latch voltage VHL of a predetermined grayscale in a non-operation period.

The holding latch voltage VHL may be set to an average grayscale of the image data DATA displayed on a previous data line and the image data displayed on a current data line.

A display device 100 of the disclosure may comprise a display panel 110 where a plurality of gate lines GL, a plurality of data lines DL, and a plurality of subpixels SP are disposed, a gate driving circuit 120 configured to supply scan signals SCAN to the plurality of gate lines GL, a data driving circuit 130 configured to convert digital image data DATA into an analog data voltage Vdata and supply the analog data voltage to the plurality of data lines DL, a timing controller 140 configured to control the gate driving circuit 120 and the data driving circuit 130, a first gamma circuit 1370*a* configured to generate a first gamma voltage VGAM1 corresponding to a first pixel during a period corresponding to a first color selection signal SEL_R1, SEL_G1, or SEL_B1, and a second gamma circuit 1370*b* configured to generate a second gamma voltage VGAM2 corresponding to a second pixel during a period corresponding to a second color selection signal SEL_R2, SEL_G2, or SEL_B2 different from the first color selection signal SEL_R1, SEL_G1, or SEL_B1.

The data driving circuit 130 may include a shift register 1310 configured to generate a sampling signal, a common sampling latch circuit 1320 configured to sequentially sample image data DATA according to the sampling signal, a first holding latch circuit 1330*a* configured to output the image data DATA sampled by the common sampling latch circuit 1320 in synchronization with a first source output enable signal SOE1, a second holding latch circuit 1330*b* configured to output the image data DATA sampled by the common sampling latch circuit 1320 in synchronization with a second source output enable signal SOE2, a first decoder 1350*a* configured to convert the image data DATA transferred from the first holding latch circuit 1330*a* into an analog data voltage in response to the first gamma voltage VGAM1, a second decoder 1350*b* configured to convert the image data DATA transferred from the second holding latch circuit 1330*b* into an analog data voltage in response to the second gamma voltage VGAM2, a multiplexer 1340 configured to output an analog data voltage corresponding to the first gamma voltage VGAM1 or the second gamma voltage VGAM2 according to the first gamma selection signal SEL_VGAM1 and the second gamma selection signal SEL_VGAM2, and an output buffer 1360 configured to supply the analog data voltage to a corresponding data line DL.

The pixels may include a red subpixel, a green subpixel, and a blue subpixel. One horizontal period 1H driving a horizontal line of the display panel 110 may include a first sub-period SH1 for driving the red subpixel, a second sub-period SH2 for driving the green subpixel, and a third sub-period SH3 for driving the blue subpixel. The first source output enable signal SOE1 and the second source output enable signal SOE2 may be generated every two sub-period interval. The first color selection signal SEL_R1, SEL_G1, or SEL_B1 and the second color selection signal SEL_R2, SEL_G2, or SEL_B2 may be maintained in the two sub-period interval.

The data driving circuit may include a shift register 1310 configured to generate a sampling signal, a common sampling latch circuit 1320 configured to sequentially sample image data DATA according to the sampling signal, a common holding latch circuit 1320 configured to output the image data DATA sampled by the common sampling latch circuit 1320 in synchronization with a source output enable signal, a first multiplexer 1340*a* configured to output image data DATA corresponding to the first gamma voltage VGAM1 according to a first gamma selection signal SEL_VGAM1, a second multiplexer 1340*b* configured to output image data DATA corresponding to the second gamma voltage VGAM2 according to a second gamma selection signal SEL_VGAM2, a first decoder 1350*a* configured to convert the image data DATA transferred from the first multiplexer 1340*a* into an analog data voltage in response to the first gamma voltage VGAM1, a second decoder 1350*b* configured to convert the image data DATA transferred from the second multiplexer 1340*b* into an analog data voltage in response to the second gamma voltage VGAM2, a third multiplexer 1340*c* configured to output an analog data voltage corresponding to the first gamma voltage VGAM1 or the second gamma voltage VGAM2 according to the first gamma selection signal SEL_VGAM1 and the second gamma selection signal SEL_VGAM2, and an output buffer 1360 configured to supply the analog data voltage to a corresponding data line DL.

The pixels may include a red subpixel, a green subpixel, and a blue subpixel. One horizontal period 1H driving a horizontal line of the display panel 110 may include a first sub-period SH1 for driving the red subpixel, a second sub-period SH2 for driving the green subpixel, and a third sub-period SH3 for driving the blue subpixel. The first color selection signal SEL_R1, SEL_G1, or SEL_B1 and the second color selection signal SEL_R2, SEL_G2, or SEL_B2 may be maintained in the two sub-period interval.

The first multiplexer 1340*a* and the second multiplexer 1340*b* may be supplied with a holding latch voltage VHL of a predetermined grayscale in a non-operation period.

The holding latch voltage VHL may be set to an average grayscale of the image data DATA displayed on a previous data line and the image data displayed on a current data line.

The first pixel may be an odd-numbered pixel, and the second pixel may be an even-numbered pixel.

The first gamma circuit 1370*a* and the second gamma circuit 1370*b* may change their driving order on basis of data line or on basis of frame.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles described herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A data driving circuit configured to drive a display panel having pixels arranged in a matrix structure, each of the pixels including a plurality of subpixels, the data driving circuit comprising:

a shift register configured to generate a sampling signal;

a common sampling latch circuit configured to sample image data according to the sampling signal;

a first holding latch circuit configured to output the image data sampled by the common sampling latch circuit based on a first source output enable signal;

a second holding latch circuit configured to output the image data sampled by the common sampling latch circuit based on a second source output enable signal;

a first gamma circuit configured to generate a first gamma voltage corresponding to a first pixel during a first period based on a first color selection signal;

a second gamma circuit configured to generate a second gamma voltage corresponding to a second pixel during a second period based on a second color selection signal different from the first color selection signal;

a first decoder configured to convert image data output from the first holding latch circuit into a first analog data voltage in response to the first gamma voltage;

a second decoder configured to convert image data output from the second holding latch circuit into a second analog data voltage in response to the second gamma voltage;

a multiplexer configured to output an analog data voltage corresponding to the first gamma voltage or the second gamma voltage based on a first gamma selection signal and a second gamma selection signal; and an output buffer configured to supply the analog data voltage to a corresponding data line, wherein the first color selection signal and the second color selection signal overlap with one another for a sub-period that is shorter than the first period or the second period.

2. The data driving circuit of claim 1, wherein the pixels include a red subpixel, a green subpixel, and a blue subpixel, wherein a horizontal period for driving a horizontal line of the display panel includes a first sub-period for driving the red subpixel, a second sub-period for driving the green subpixel, and a third sub-period for driving the blue subpixel, wherein the first source output enable signal and the second source output enable signal are generated every two sub-period interval, and wherein the first color selection signal and the second color selection signal are maintained in the two sub-period interval.

3. The data driving circuit of claim 1, wherein the first pixel is an odd-numbered pixel, and the second pixel is an even-numbered pixel.

4. The data driving circuit of claim 1, wherein the first gamma circuit and the second gamma circuit are configured to change their respective driving order based on a data line or a frame of the image data.

5. A data driving circuit configured to drive a display panel having pixels arranged in a matrix structure, each of the pixels including a plurality of subpixels, the data driving circuit comprising:

a shift register configured to generate a sampling signal;

a common sampling latch circuit configured to sample image data according to the sampling signal;

a common holding latch circuit configured to output the image data sampled by the common sampling latch circuit based on a source output enable signal;

a first gamma circuit configured to generate a first gamma voltage corresponding to a first pixel during a period based on a first color selection signal;

a second gamma circuit configured to generate a second gamma voltage corresponding to a second pixel during a period based on a second color selection signal different from the first color selection signal;

a first multiplexer configured to output image data corresponding to the first gamma voltage based on a first gamma selection signal;

a second multiplexer configured to output image data corresponding to the second gamma voltage based on a second gamma selection signal;

a first decoder configured to convert image data output from the first multiplexer into a first analog data voltage in response to the first gamma voltage;

a second decoder configured to convert the image data transferred from the second multiplexer into a second analog data voltage in response to the second gamma voltage;

a third multiplexer configured to output an analog data voltage corresponding to the first gamma voltage or the second gamma voltage based on a first gamma selection signal and a second gamma selection signal; and an output buffer configured to supply the analog data voltage to a corresponding data line, wherein the first multiplexer and the second multiplexer are supplied with a holding latch voltage of a grayscale in a non-operation period.

6. The data driving circuit of claim 5, wherein the pixels include a red subpixel, a green subpixel, and a blue subpixel, wherein a first horizontal period for driving a horizontal line of the display panel includes a first sub-period for driving the red subpixel, a second sub-period for driving the green subpixel, and a third sub-period for driving the blue subpixel, and wherein the first color selection signal and the second color selection signal are maintained in the two sub-period interval.

7. The data driving circuit of claim 5, wherein the first pixel is an odd-numbered pixel, and the second pixel is an even-numbered pixel.

8. The data driving circuit of claim 5, wherein the first gamma circuit and the second gamma circuit are configured to change their respective driving order based on a data line or a frame of the image data.

9. The data driving circuit of claim 5, wherein the holding latch voltage has an average grayscale of image data displayed on a previous data line and image data displayed on a current data line.

10. A display device, comprising:

a display panel where a plurality of gate lines, a plurality of data lines, and a plurality of subpixels are disposed;

a gate driving circuit configured to supply scan signals to the plurality of gate lines;

a data driving circuit configured to convert digital image data into an analog data voltage and supply the analog data voltage to the plurality of data lines; and a timing controller configured to control the gate driving circuit and the data driving circuit, wherein the data driving circuit includes:

a first gamma circuit configured to generate a first gamma voltage corresponding to a first pixel during a first period based on a first color selection signal; and a second gamma circuit configured to generate a second gamma voltage corresponding to a second pixel during a second period based on a second color selection signal different from the first color selection signal, and wherein the first color selection signal and the second color selection signal overlap with one another for a sub-period that is shorter than the first period or the second period.

11. The display device of claim 10, wherein the data driving circuit includes:

a shift register configured to generate a sampling signal;

a common sampling latch circuit configured to sequentially sample image data according to the sampling signal;

a first holding latch circuit configured to output the image data sampled by the common sampling latch circuit in synchronization with a first source output enable signal;

a second holding latch circuit configured to output the image data sampled by the common sampling latch circuit in synchronization with a second source output enable signal;

a first decoder configured to convert the image data output from the first holding latch circuit into a first analog data voltage in response to the first gamma voltage;

a second decoder configured to convert the image data output from the second holding latch circuit into a second analog data voltage in response to the second gamma voltage;

a multiplexer configured to output an analog data voltage corresponding to the first gamma voltage or the second gamma voltage based on a first gamma selection signal and a second gamma selection signal; and an output buffer configured to supply the analog data voltage to a corresponding data line.

12. The display device of claim 11, wherein the pixels include a red subpixel, a green subpixel, and a blue subpixel, wherein a first horizontal period for driving a horizontal line of the display panel includes a first sub-period for driving the red subpixel, a second sub-period for driving the green subpixel, and a third sub-period for driving the blue subpixel, wherein the first source output enable signal and the second source output enable signal are generated every two sub-period intervals, and wherein the first color selection signal and the second color selection signal are maintained in the two sub-period interval.

13. The display device of claim 10, wherein the data driving circuit is configured to drive a display panel having pixels arranged in a matrix structure, each of the pixels including a plurality of subpixels, the data driving circuit including:

a shift register configured to generate a sampling signal;

a common sampling latch circuit configured to sample image data according to the sampling signal;

a common holding latch circuit configured to output the image data sampled by the common sampling latch circuit based on a source output enable signal;

a first multiplexer configured to output image data corresponding to the first gamma voltage based on a first gamma selection signal;

a second multiplexer configured to output image data corresponding to the second gamma voltage based on a second gamma selection signal;

a first decoder configured to convert the image data transferred from the first multiplexer into a first analog data voltage in response to the first gamma voltage;

a second decoder configured to convert the image data transferred from the second multiplexer into a second analog data voltage in response to the second gamma voltage;

a third multiplexer configured to output an analog data voltage corresponding to the first gamma voltage or the second gamma voltage based on the first gamma selection signal and the second gamma selection signal; and an output buffer configured to supply the analog data voltage to a corresponding data line.

14. The display device of claim 13, wherein the pixels include a red subpixel, a green subpixel, and a blue subpixel, wherein one first horizontal period for driving a horizontal line of the display panel includes a first sub-period for driving the red subpixel, a second sub-period for driving the green subpixel, and a third sub-period for driving the blue subpixel, and wherein the first color selection signal and the second color selection signal are maintained in the two sub-period interval.

15. The display device of claim 13, wherein the first multiplexer and the second multiplexer are supplied with a holding latch voltage of a grayscale in a non-operation period.

16. The display device of claim 15, wherein the holding latch voltage has an average grayscale of image data displayed on a previous data line and image data displayed on a current data line.

17. The display device of claim 10, wherein the first pixel is an odd-numbered pixel, and the second pixel is an even-numbered pixel.

18. The display device of claim 10, wherein the first gamma circuit and the second gamma circuit are configured to change their respective driving order based on a data line or a frame of the image data.

* * * * *